United States Patent
Tsai et al.

(10) Patent No.: US 10,645,668 B2
(45) Date of Patent: May 5, 2020

(54) INDOOR POSITIONING SYSTEM AND METHOD BASED ON GEOMAGNETIC SIGNALS IN COMBINATION WITH COMPUTER VISION

(71) Applicant: OSENSE TECHNOLOGY CO., LTD., Taipei (TW)

(72) Inventors: Hung-Ya Tsai, Taipei (TW); You-Kwang Wang, Taipei (TW)

(73) Assignee: OSENSE TECHNOLOGY CO., LTD., Taipei (TW)

(*) Notice: Subject to any disclaimer, the term of this patent is extended or adjusted under 35 U.S.C. 154(b) by 0 days.

(21) Appl. No.: 16/421,540

(22) Filed: May 24, 2019

(65) Prior Publication Data

US 2019/0380106 A1 Dec. 12, 2019

Related U.S. Application Data

(60) Provisional application No. 62/681,721, filed on Jun. 7, 2018.

(30) Foreign Application Priority Data

Dec. 17, 2018 (TW) .............................. 107145464 A

(51) Int. Cl.
*G01S 5/02* (2010.01)
*G01C 21/20* (2006.01)
(Continued)

(52) U.S. Cl.
CPC .......... *H04W 64/003* (2013.01); *G01C 21/08* (2013.01); *G01C 21/165* (2013.01);
(Continued)

(58) Field of Classification Search
CPC ....... G06K 9/00771; G06F 3/017; G06T 7/74; G01C 21/206
(Continued)

(56) References Cited

U.S. PATENT DOCUMENTS 8,818,424 B2 * 8/2014 Emadzadeh .......... G01S 5/0242
455/457
9,109,889 B2 * 8/2015 Soubra ................... G01C 15/00
(Continued)

*Primary Examiner* — William D Cumming
(74) *Attorney, Agent, or Firm* — Amin, Turocy & Watson, LLP

(57) ABSTRACT

Provided are an indoor positioning system and method based on geomagnetic signals in combination with computer vision, including: a computer vision positioning module for acquiring a spatial image of a surrounding environment to create computer vision coordinates; a geomagnetic signal positioning module for detecting trajectories of the geomagnetic signals for creating geomagnetic signal coordinates; a map generating module including a database for storing the created computer vision coordinates and the created geomagnetic signal coordinates, and an inertial measurement unit for detecting a current position and a traveling trajectory, to generate a computer vision map and a geomagnetic data map; and a weighting module for calculating a computer vision weight and a geomagnetic signal weight based on the created computer vision coordinates and the created geomagnetic signal coordinates, and inputting the computer vision weight and the geomagnetic signal weight in a weight equation to estimate a present location.

14 Claims, 2 Drawing Sheets

(51) Int. Cl.
*H04W 64/00* (2009.01)
*G01C 21/16* (2006.01)
*G06T 7/70* (2017.01)
*G01C 21/08* (2006.01)

(52) U.S. Cl.
CPC .............. *G01C 21/206* (2013.01); *G06T 7/70* (2017.01); *G06T 2207/30244* (2013.01)

(58) Field of Classification Search
USPC .............................................. 455/456.1, 457
See application file for complete search history.

(56) References Cited

U.S. PATENT DOCUMENTS

| | | | |
|---|---|---|---|
| 9,134,127 B2* | 9/2015 | Soubra | G01C 15/00 |
| 9,772,395 B2* | 9/2017 | Park | G06K 9/00771 |
| 9,998,874 B2* | 6/2018 | Sendonaris | G01S 5/0252 |
| 10,114,464 B2* | 10/2018 | Micali | G06F 3/017 |
| 10,262,437 B1* | 4/2019 | Ter Beest, III | G06F 16/29 |
| 2014/0187257 A1* | 7/2014 | Emadzadeh | G01S 5/0242 |
| | | | 455/456.1 |
| 2017/0003751 A1* | 1/2017 | Micali | G06F 3/017 |
| 2017/0090007 A1* | 3/2017 | Park | G06K 9/00771 |
| 2017/0094471 A1* | 3/2017 | Sendonaris | G01S 5/0252 |
| 2018/0196118 A1* | 7/2018 | Park | G06K 9/00771 |
| 2018/0262880 A1* | 9/2018 | Sendonaris | G01S 5/0252 |
| 2019/0018499 A1* | 1/2019 | Micali | G01C 17/38 |
| 2019/0049250 A1* | 2/2019 | Takaoka | G01C 21/20 |
| 2019/0380106 A1* | 12/2019 | Tsai | G01C 21/206 |

\* cited by examiner

INDOOR POSITIONING SYSTEM AND METHOD BASED ON GEOMAGNETIC SIGNALS IN COMBINATION WITH COMPUTER VISION

BACKGROUND

1. Technical Field

The present disclosure relates to an indoor positioning system, and more particularly, to an indoor positioning system based on geomagnetic signal positioning technology in combination with computer vision positioning technology.

2. Description of Related Art

As the development of internet of things (IoT) applications has gradually matured, Online to Offline (O2O) business model has become a booming industry. As a result, indoor positioning technology is developed to provide O2O more options with new combination of strategies.

Most of the current indoor positioning technology is based and build upon hardware equipment, such as the existing Becon or WiFi positioning, which utilize the signal strength between the hardware equipment and obtain the current position of the moving device via the calculation of triangulation positioning. However, in order to achieve the effect of accurate positioning, current Beacon or WiFi positioning technology both require a large amount of bluetooth nodes or increased number of WiFi routers. It is inevitable that the initial cost for construction is rather high as a result of high demand for hardware, let alone the maintenance and upgrading cost and technical problems that will be faced for operation.

In order to reduce the hardware equipment cost, computer vision positioning and geomagnetic signal positioning are current technologies. Current computer vision positioning features Visual-Inertial Odometry (VIO) and camera lens to record the indoor image and spatial coordinate system to generate indoor image data which is matched with the image created during map generating to capture the coordinate values, thereby achieving the goal of positioning. However, the indoor positioning image data may become too big when the field to be positioned is large. This will occupy a lot of CPUs' computation and thus slows down the operation and thereby affecting the comparing time.

On the other hand, geomagnetic signal positioning uses geomagnetic signals for indoor positioning. When the indoor image data is constructed, both the geomagnetic signals and coordinate system of the indoor space will be recorded at the same time to generate a final geomagnetic indoor image data. However, as the geomagnetic is a wave signal that will have slight fluctuations in different time, the relative relations of the signal remain constant. Therefore, in the user mode, when the user has a position shift, the repositioning can be done via algorithm. However, when the field is too big, convergence time will take longer, i.e., the user is required to travel for longer distance for effective positioning.

From the above, it is clear that there are drawbacks of the current indoor positioning technology. In view of these drawbacks arise from the current technology, the inventor of the present disclosure successfully develops an indoor positioning system based on geomagnetic signal in combination with computer vision.

SUMMARY

In light of the foregoing, the present disclosure provides an indoor positioning system based on geomagnetic signals in combination with computer vision, comprising: a computer vision positioning module comprising an camera unit for capturing a spatial image of a surrounding environment to create computer vision coordinates; a geomagnetic signal positioning module comprising a geomagnetic sensing unit for detecting trajectories of geomagnetic signals to create geomagnetic signal coordinates; a map generating module comprising a database for storing the created computer vision coordinates and the created geomagnetic signal coordinates, and an inertial measurement unit for detecting a current position and a traveling trajectory, so as to combine the computer vision coordinates with the geomagnetic signal coordinates to generate a computer vision map and a geomagnetic data map; and a weighting module for calculating out a computer vision weight and a geomagnetic signal weight based on the created computer vision coordinates and the created geomagnetic signal coordinates, and inputting the computer vision weight and the geomagnetic signal weight in a weight equation to estimate a present location; wherein the weight equation is:

$$\frac{W_1}{(W_1+W_2)\times(x_1,z_1)}+\frac{W_2}{(W_1+W_2)\times(x_2,z_2)},$$

wherein x and y coordinates of the computer vision positioning module are indicated as $x_1$ and $z_1$, respectively, the computer vision weight is indicated as $W_1$, x and y coordinates of the geomagnetic signal positioning module are indicated as $x_2$ and $z_2$ respectively, and the geomagnetic signal weight is indicated as $W_2$.

The present disclosure further provides an indoor positioning method based on geomagnetic signals in combination with computer vision, comprising: capturing a spatial image of a surrounding environment for creating computer vision coordinates through an camera unit; detecting trajectories of geomagnetic signals through a geomagnetic sensing unit for creating geomagnetic signal coordinates; storing the created computer vision coordinates and the geomagnetic signal coordinates in a database; detecting a current position and a traveling trajectory via an inertial measurement unit to combine the computer vision coordinates with the geomagnetic signals coordinates, so as to generate a computer vision map and a geomagnetic data map; and calculating a computer vision weight and a geomagnetic signal weight based on the created computer vision coordinates and the created geomagnetic signal coordinates, and estimating a present location by inputting the computer vision weight and the geomagnetic signal weight in a weight equation; wherein the weight equation is:

$$\frac{W_1}{(W_1+W_2)\times(x_1,z_1)}+\frac{W_2}{(W_1+W_2)\times(x_2,z_2)},$$

wherein x and y coordinates of the computer vision coordinates are indicated as $x_1$ and $z_1$, respectively, the computer vision weight is indicated as $W_1$, x and y coordinates of the geomagnetic signal coordinates are indicated as $x_2$ and $z_2$, respectively, and the geomagnetic signal weight is indicated as $W_2$.

As mentioned in the foregoing indoor positioning system and method, the geomagnetic signal weight is calculated based on a geomagnetic confidence value, and the geomagnetic confidence value is calculated by matching geomagnetic fingerprint distributions measured currently with geomagnetic fingerprint distributions created previously, wherein an equation of calculating the geomagnetic confidence value is:

$$X_1 = \frac{\sqrt{(Bx - Bx')^2 + (By - By')^2 + (Bz - Bz')^2}}{\sqrt{(Bx)^2 + (By)^2 + (Bz)^2}} \times 100\%,$$

wherein the geomagnetic confidence value is indicated as $X_1$, the geomagnetic fingerprint distributions created previously are indicated as Bx, By and Bz, and the geomagnetic fingerprint distributions measured currently are indicated as Bx', By' and Bz'.

As mentioned in the foregoing indoor positioning system and method, the equation of calculating the geomagnetic signal weight is:

$$W_2 = \frac{1}{\sqrt{2\pi \times 0.5}} e^{-\frac{(x_2)^2}{2 \times (0.5)^2}},$$

wherein the geomagnetic signal weight is indicated as $W_2$, the geomagnetic confidence value is indicated as $X_2$, and an exponential function is indicated as e.

As described in the foregoing indoor positioning system and method, the computer vision weight is calculated based on a computer vision confidence value. The computer vision confidence value is calculated by matching Hamming distances between descriptors formed by extracting feature points, wherein the equation of calculating the computer vision confidence value is:

$$X_2 = \left(1 - \frac{e}{n \times 8}\right) \times 100\%,$$

wherein the computer vision confidence value is indicated as $X_2$, a size of the descriptors is indicated as n and is in unit of bits, and a matched hamming distance is indicated as e and is in unit of bits.

As described in the foregoing indoor positioning system and method, the descriptors include SIFT-like descriptors or binary descriptors.

As described in the foregoing indoor positioning system and method, an equation of calculating the computer vision weight is:

$$W_2 = \frac{1}{\sqrt{2\pi \times 0.5}} e^{-\frac{(x_2)^2}{2 \times (0.5)^2}},$$

wherein the computer vision weight is indicated as $W_2$, the computer vision confidence value is indicated as $X_2$, and the exponential function is indicated as e.

The foregoing indoor positioning system and method further comprise a Bag of Words (BOW) model learning module for reducing a dimension of image frames, so as to reduce the matching time.

In the foregoing indoor positioning system and method, a Visual-Inertia Odometry (VIO) algorithm is used to track the moving trajectory, so as to create the computer vision coordinates.

In the foregoing indoor positioning system and method, a particle filter algorithm is utilized to match moving trajectories of differential curve of the magnetic fields, so as to create the geomagnetic signal coordinates.

Regardless whether it is computer vision based positioning technology or geomagnetic signal based positioning technology, some degrees of deficiencies exist. Based on the advantages and disadvantages of the two positioning technologies, the present disclosure is able to improve the accuracy of positioning through utilizing a weight model module as the core principle, in which both computer vision positioning system and geomagnetic signal positioning system respectively and simultaneously provide a set of user coordinate to ensure that the location of the user is accurate. In the perfect scenario, these two sets of coordinates should be identical; however, in most instances, these two sets of coordinates may be close but not identical. Sometimes, very rarely, these two systems may give completely different coordinates. Therefore the goal of the weight model provided by the present disclosure is to decide which one of the two systems should govern when the two systems determine that the user is in completely different locations. Each weight value of the dual system will be inserted into the weight module, and a final result is determined based on a probability model using the two weight values. This can successfully solve the problem of occasional failure of positioning.

BRIEF DESCRIPTION OF DRAWINGS

The present disclosure can be more fully understood by reading the following detailed description of the embodiments, with reference made to the accompanying drawings, wherein.

DETAILED DESCRIPTION OF EMBODIMENTS

The present disclosure is described in the following with specific embodiments, so that one skilled in the art can easily understand advantages and effects of the present disclosure from the disclosure of the present disclosure.

It should be noted that all the drawings are not intended to limit the present disclosure. Various modification and variations such as structural modifications or proportional changes in the structures can be made without departing from the spirit of the present disclosure and should not be construed to fall within the scope of the present disclosure.

Figure 1:
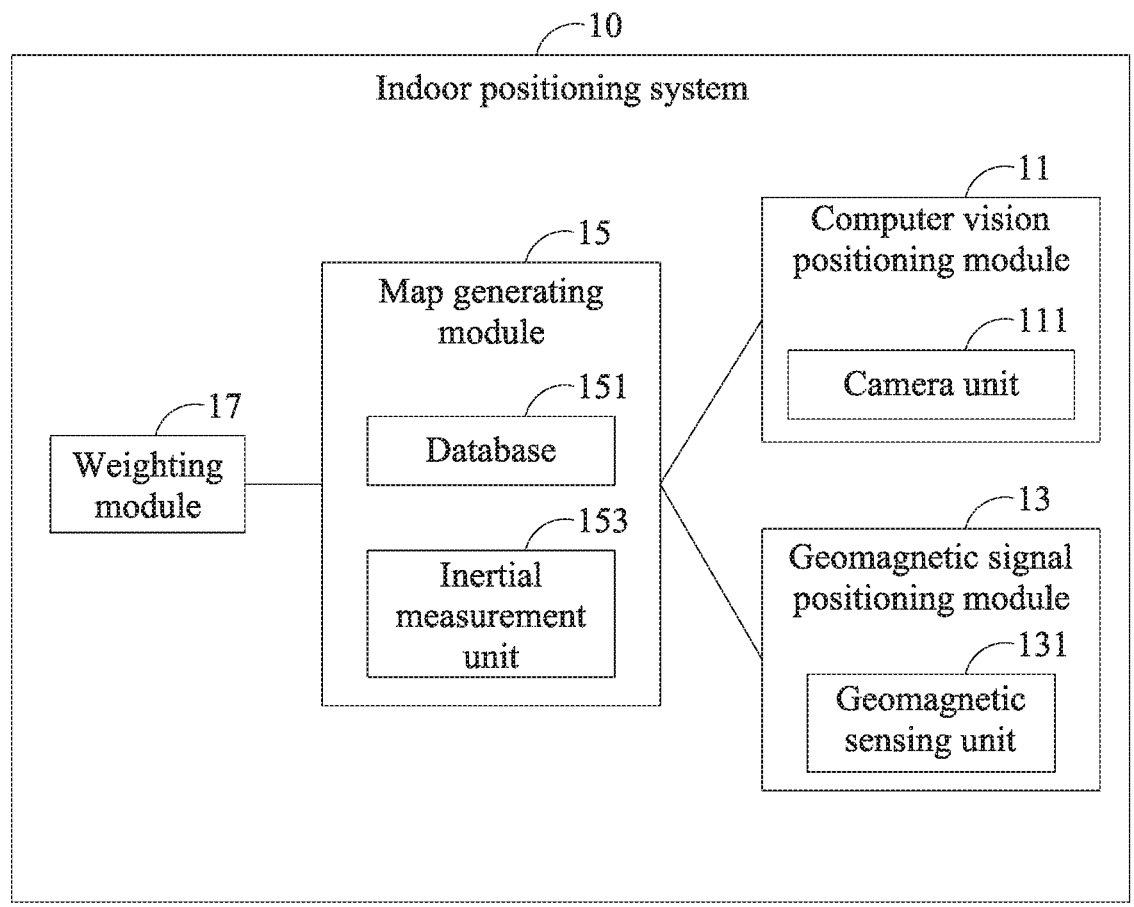
FIG. 1 is a schematic system architecture diagram of the indoor positioning system based on geomagnetic signals in combination with computer vision in accordance with the present disclosure.

Referring to FIG. 1, the present disclosure discloses an indoor positioning system 10 based on geomagnetic signals in combination with computer vision, comprising: a computer vision positioning module 11, a geomagnetic signal positioning module 13, a map generating module 15 and a weighting module 17.

The computer vision positioning module 11 comprises an camera unit 111 to capture a spatial image of a surrounding environment for creating computer vision coordinates, where the image captured by the camera unit 111 is matched with the image created in a database 151, to find the most similar image based on Visual-Inertial Odometry (VIO) algorithm, and the corresponding coordinate values are then captured to confirm the current coordinates of the user. A conventional image comparing method requires a long time when the indoor field is too wide. The present disclosure further provides a Bag of Words (BOW) learning model to reduce the dimension of the image frame and store each frame in the reduced-dimension through machine learning architecture, such that the matching time can be reduced.

The geomagnetic signal positioning module 13 comprises a geomagnetic sensing unit 131 for detecting a trajectory of the geomagnetic signals to create geomagnetic signal coordinates. When the geomagnetic signal positioning module 13 creates the geomagnetic signal coordinates, the geomagnetic sensing unit 131 detects the current geomagnetic signal and matches it with the geomagnetic signals in the database 151, so as to find out a matched result. Because of the geomagnetic signal is a wave signal, the geomagnetic signal has different offset values in different time. That is, the geomagnetic sensing unit 131 is readily magnetized due to an external magnetic field and thus generates different initial values, so that an actual intensity value in a same magnetic field may be varied in different time point. However, a differential value of the magnetic field measured along a same trajectory is constant. In other words, rather than matching the actual intensity value of the magnetic field at each position point, the geomagnetic positioning module matches a differential curve of the magnetic field in a trajectory and provides positioning through particle filter algorithm. Nevertheless, when the field is too wide, the particle convergence time will take longer. Therefore, the present disclosure is further incorporated with the computer vision positioning, so as to improve user experience.

The map generating module 15 can be an application software developed for smartphones comprises the database 151 for storing the created computer vision coordinates and the created geomagnetic signal coordinates, accesses the camera unit 111, the geomagnetic sensing unit 131, and also detects the current position and the traveling trajectory through the inertial measurement unit 153. The user may initiate the application software and freely walk. A coordinate system is-created by applying the VIO algorithm to track the user's trajectory and collect the image and geomagnetic data on the trajectory, such that the computer vision coordinates and the geomagnetic signal coordinates are combined to generate a computer vision map and a geomagnetic maps.

The weighting module 17 calculates a computer vision confidence value and a geomagnetic confidence value based on the created computer vision coordinates and the created geomagnetic signal coordinates, and then further calculates a computer vision weight and a geomagnetic signal weight.

The geomagnetic confidence value is calculated by matching geomagnetic fingerprint distributions previously created with geomagnetic fingerprint distributions currently measured, wherein the equation of calculating the geomagnetic confidence value is:

$$X_1 = \frac{\sqrt{(Bx-Bx')^2 + (By-By')^2 + (Bz-Bz')^2}}{\sqrt{(Bx)^2 + (By)^2 + (Bz)^2}} \times 100\%$$

wherein $X_1$ is geomagnetic confidence value, the geomagnetic fingerprint distributions previously created are indicated as Bx, By, Bz, and the geomagnetic fingerprint distributions currently measured are indicated as Bx', By', Bz'.

After obtaining the geomagnetic confidence value, the geomagnetic signal weight is further calculated. The equation of calculating the geomagnetic signal weight is:

$$W_2 = \frac{1}{\sqrt{2\pi \times 0.5}} e^{-\frac{(x_2)^2}{2 \times (0.5)^2}},$$

wherein $W_2$ is the geomagnetic signal weight, $X_2$ is the geomagnetic confidence value, and e is an exponential function.

The computer vision confidence value is calculated by matching Hamming distances between the descriptors extracted from the feature points. It has three steps in a computer vision identification: 1) Feature Detection 2) Descriptor Generation; and 3) Matching.

The descriptors are a series of word strings that are used to describe features, which fall into two categories: SIFT-like descriptors and binary descriptors, the main differences of which are accuracy and efficiency of calculation. As to focus on efficiency of calculation, the binary descriptors are applied in the preferred embodiment of the present disclosure, so as to indicated the image intensity distribution around the feature points. The computer vision confidence value can be converted by matching the Hamming distances between the descriptors. The equation of calculating the computer vision confidence value is:

$$X_2 = \left(1 - \frac{e}{n \times 8}\right) \times 100\%,$$

wherein the computer vision confidence value is indicated as $X_2$, a size of descriptors is indicated as n which is in unit of bits, and the matched hamming distance is indicated as e which is in the unit of bits.

Moreover, the computer vision weight is calculated based on the computer vision confidence value. The equation of calculating the computer vision weight is:

$$W_2 = \frac{1}{\sqrt{2\pi \times 0.5}} e^{-\frac{(x_2)^2}{2 \times (0.5)^2}},$$

wherein $W_2$ is the computer vision weight, $X_2$ is the computer vision confidence value, and e is the exponential function.

After obtaining the computer vision weight and the geomagnetic signal weight, the computer vision weight and the geomagnetic signal weight are inputted in a weight equation to estimate the present location, wherein the weight equation is:

$$\frac{W_1}{(W_1 + W_2) \times (x_1, z_1)} + \frac{W_2}{(W_1 + W_2) \times (x_2, z_2)},$$

wherein $x_1$, $z_1$ are represented as x and y coordinates of the computer vision positioning module respectively, $W_1$ is represented as the computer vision weight, $x_2$, $z_2$ are represented as x and y coordinates of the geomagnetic signal positioning module respectively, and $W_2$ is represented as the geomagnetic signal weight.

The system fault tolerance, accuracy, robustness and usability are enhanced by the weighting module 17 giving weight to integrate the computer vision positioning module and the geomagnetic signal positioning module. The present disclosure provides the above mentioned advantages and suitability of both computer vision positioning and geomagnetic signal positioning. The computer vision positioning can achieve a better efficient in a relatively simple field without having large-scaled changes or in a scenario having large instruments or vehicles shuttling therethrough. On other hand, the geomagnetic signal positioning can achieve highly identification accuracy without being affected by objects such as passers in a complex scenario having intensive walkers. On the basis of the computer vision confidence value, the weighting module 17 applies the Gaussian Probability Function to obtain the computer vision weight value and match the differential value of the magnetic field on the trajectory of the geomagnetic signals with the differential value of the geomagnetic fingerprint map. The deviation value accumulated in the trajectory is further inputted in the Gaussain Probability Function, so as to obtain the geomagnetic signal weight value. That is, according to the weight integrated model, there is no need to rely on a single system and thereby it is capable of enhancing the system variety, stability and accuracy for the indoor positioning system of the present disclosure.

Figure 2:
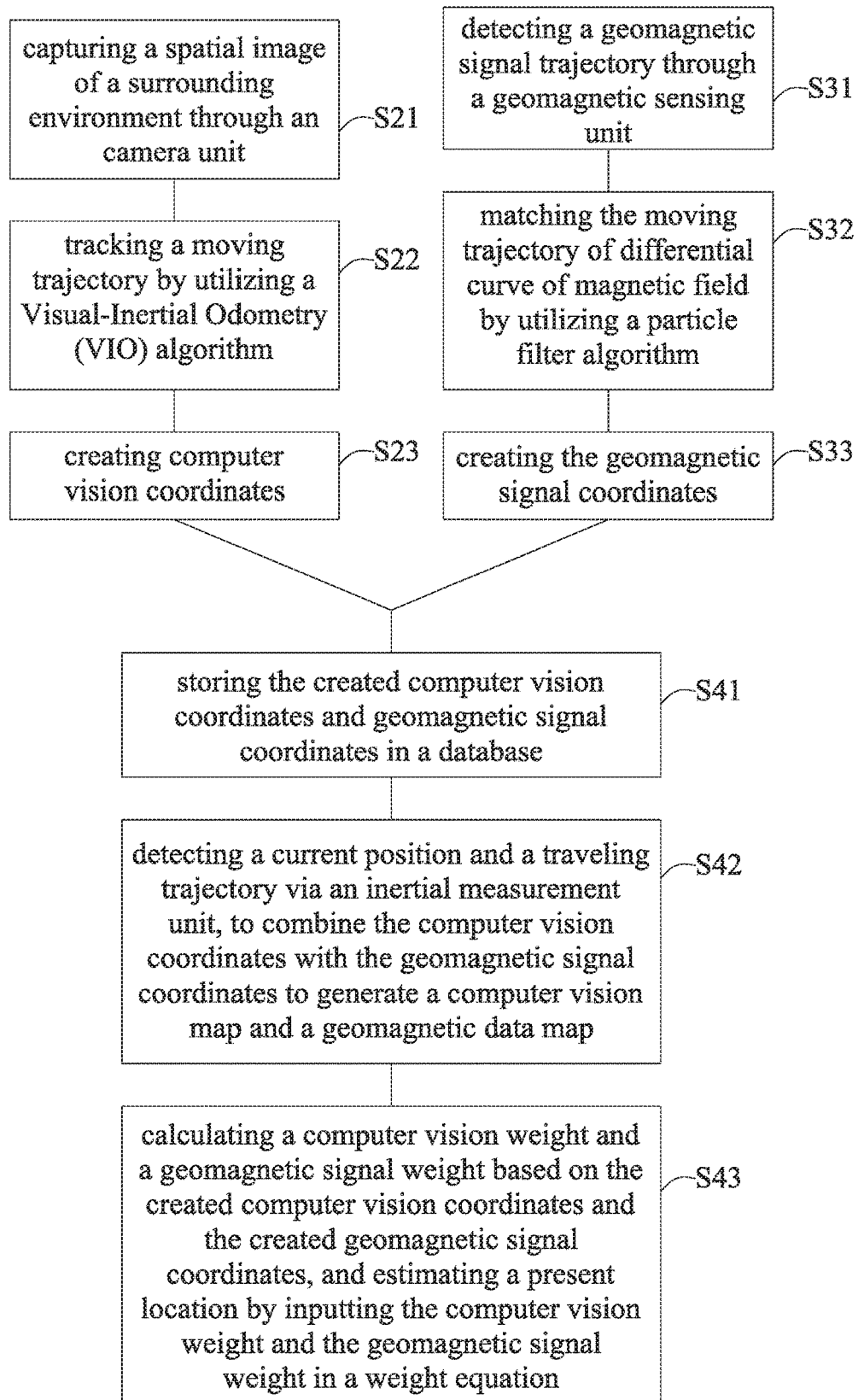
FIG. 2 is a schematic flowchart of the indoor positioning method based on geomagnetic signals in combination with computer vision in accordance with the present disclosure.

As shown in FIG. 2, the indoor positioning method based on geomagnetic signal in combination with computer vision of the present disclosure comprises: step S21: capturing a spatial image of a surrounding environment through an camera unit; step S22: tracking a moving trajectory by utilizing a Visual-Inertial Odometry (VIO) algorithm; step S23: creating computer vision coordinates; step S31: detecting a geomagnetic signal trajectory through a geomagnetic sensing unit; step S32: matching the moving trajectory of differential curve of magnetic field by utilizing a particle filter algorithm; step S33: creating the geomagnetic signal coordinates; step S41: storing the created computer vision coordinates and geomagnetic signal coordinates in a database; step S42: detecting a current position and a traveling trajectory via an inertial measurement unit, to combine the computer vision coordinates with the geomagnetic signal coordinates to generate a computer vision map and a geomagnetic data map; step S43: calculating a computer vision weight and a geomagnetic signal weight based on the created computer vision coordinates and the created geomagnetic signal coordinates, and estimating a present location by inputting the computer vision weight and the geomagnetic signal weight in a weight equation.

Aforesaid specification is described on basis of an embodiment in accordance with the present disclosure. No limitations are intended to the details of construction or design herein shown, other than as described in the claims below. It is therefore evident that the particular embodiments disclosed above may be altered or modified and all such variations are considered within the scope and spirit of the disclosure.

What is claimed is:

1. An indoor positioning system based on geomagnetic signals in combination with computer vision, comprising:
    a computer vision positioning module comprising a camera unit for obtaining a spatial image of a surrounding environment to create computer vision coordinates;
    a geomagnetic signal positioning module comprising a geomagnetic sensing unit for detecting trajectories of geomagnetic signals for creating geomagnetic signal coordinates;
    a map generating module comprising a database for storing the created computer vision coordinates and the created geomagnetic signal coordinates, and an inertial measurement unit for detecting a current position and a traveling trajectory, so as to combine the computer vision coordinates with the geomagnetic signal coordinates to generate a computer vision map and a geomagnetic data map; and
    a weighting module for calculating a computer vision weight and a geomagnetic signal weight based on the created computer vision coordinates and the created geomagnetic signal coordinates, and inputting the computer vision weight and the geomagnetic signal weight in a weight equation to estimate a present location;
    wherein the weight equation is:

$$\frac{W_1}{(W_1+W_2)\times(x_1,z_1)}+\frac{W_2}{(W_1+W_2)\times(x_2,z_2)},$$

wherein x and y coordinates of the computer vision positioning module are indicated as $x_1$ and $z_1$, respectively, the computer vision weight is indicated as $W_1$, x and y coordinates of the geomagnetic signal positioning module are indicated as $x_2$ and $z_2$, respectively, and the geomagnetic signal weight is indicated as $W_2$.

2. The indoor positioning system of claim 1, wherein the geomagnetic signal weight is calculated based on a geomagnetic confidence value, the geomagnetic confidence value is calculated by matching geomagnetic fingerprint distributions measured currently with geomagnetic fingerprint distributions created previously, wherein an equation of calculating the geomagnetic confidence value is:

$$X_1=\frac{\sqrt{(Bx-Bx')^2+(By-By')^2+(Bz-Bz')^2}}{\sqrt{(Bx)^2+(By)^2+(Bz)^2}}\times100\%,$$

wherein the geomagnetic confidence value is indicated as $X_1$, the geomagnetic fingerprint distributions created previously are indicated as Bx, By and Bz, and the geomagnetic fingerprint distributions measured currently are indicated as Bx', By' and Bz'.

3. The indoor positioning system of claim 2, wherein an equation of calculating the geomagnetic signal weight is:

$$W_2=\frac{1}{\sqrt{2\pi\times0.5}}e^{-\frac{(x_2)^2}{2\times(0.5)^2}},$$

wherein the geomagnetic signal weight is indicated as $W_2$, the geomagnetic confidence value is indicated as $X_2$, and an exponential function is indicated as e.

4. The indoor positioning system of claim 1, wherein the computer vision weight is calculated based on a computer vision confidence value, the computer vision confidence value is calculated by matching Hamming distances between descriptors formed by extracting feature points, wherein an equation of calculating the computer vision confidence value is:

$$X_2=\left(1-\frac{e}{n\times8}\right)\times100\%,$$

wherein the computer vision confidence value is indicated as $X_2$, a size of the descriptors is indicated as n and is in unit of bits, and a matched hamming distance is indicated as e and is in unit of bits.

5. The indoor positioning system of claim 4, wherein the descriptors include SIFT-like descriptors or binary descriptors.

6. The indoor positioning system of claim 5, wherein an equation of calculating the computer vision weight is:

$$W_2 = \frac{1}{\sqrt{2\pi \times 0.5}} e^{-\frac{(x_2)^2}{2 \times (0.5)^2}},$$

wherein the computer vision weight is indicated as $W_2$, the computer vision confidence value is indicated as $X_2$, and the exponential function is indicated as e.

7. The indoor positioning system of claim 1, wherein the map generating module utilizes particle filter algorithm to match moving trajectories of differential curve of magnetic fields to create the geomagnetic signal coordinates.

8. An indoor positioning method based on geomagnetic signals in combination with computer vision, comprising:
capturing a spatial image of a surrounding environment through a camera unit for creating computer vision coordinates;
detecting trajectories of geomagnetic signals through a geomagnetic sensing unit for creating geomagnetic signal coordinates;
storing the created computer vision coordinates and the geomagnetic signal coordinates in a database;
detecting a current position and a traveling trajectory via an inertial measurement unit to combine the computer vision coordinates with the geomagnetic signal coordinates, so as to generate a computer vision map and a geomagnetic data map; and
calculating a computer vision weight and a geomagnetic signal weight based on the created computer vision coordinates and the created geomagnetic signal coordinates, and estimating a present location by inputting the computer vision weight and the geomagnetic signal weight in a weight equation;
wherein the weight equation is:

$$\frac{W_1}{(W_1 + W_2) \times (x_1, z_1)} + \frac{W_2}{(W_1 + W_2) \times (x_2, z_2)},$$

wherein x and y coordinates of the computer vision coordinates are indicated as $x_1$ and z1, respectively, the computer vision weight is indicated as $W_1$, x and y coordinates of the geomagnetic signal coordinates are indicated as $x_2$ and $z_2$, respectively, and the geomagnetic signal weight is indicated as $W_2$.

9. The indoor positioning method of claim 8, wherein the geomagnetic signal weight is calculated based on a geomagnetic confidence value, the geomagnetic confidence value is calculated by matching geomagnetic fingerprint distributions measured currently with geomagnetic fingerprint distributions created previously, wherein the equation of calculating the geomagnetic confidence value is:

$$X_1 = \frac{\sqrt{(Bx - Bx')^2 + (By - By')^2 + (Bz - Bz')^2}}{\sqrt{(Bx)^2 + (By)^2 + (Bz)^2}} \times 100\%,$$

wherein the geomagnetic confidence value is indicated as $X_1$, the geomagnetic fingerprint distributions created previously are indicated as Bx, By and Bz, and the geomagnetic fingerprint distributions measured currently are indicated as Bx', By' and Bz'.

10. The indoor positioning method of claim 9, wherein an equation of calculating the geomagnetic signal weight is:

$$W_2 = \frac{1}{\sqrt{2\pi \times 0.5}} e^{-\frac{(x_2)^2}{2 \times (0.5)^2}},$$

wherein the geomagnetic signal weight is indicated as $W_2$, the geomagnetic confidence value is indicated as $X_2$, and an exponential function is indicated as e.

11. The indoor positioning method of claim 8, wherein the computer vision weight is calculated based on a computer vision confidence value, the computer vision confidence value is calculated by matching Hamming distances between descriptors formed by extracting feature points, wherein an equation of calculating the computer vision confidence value is:

$$X_2 = \left(1 - \frac{e}{n \times 8}\right) \times 100\%,$$

wherein the computer vision confidence value is indicated as $X_2$, a size of the descriptors is indicated as n and is in unit of bits, and a matched hamming distance is indicated as e and is in unit of bits.

12. The indoor positioning method of claim 11, wherein the descriptors include SIFT-like descriptors or binary descriptors.

13. The indoor positioning method of claim 11, wherein an equation of calculating the computer vision weight is:

$$W_2 = \frac{1}{\sqrt{2\pi \times 0.5}} e^{-\frac{(x_2)^2}{2 \times (0.5)^2}},$$

wherein the computer vision weight is indicated as $W_2$, the computer vision confidence value is indicated as $X_2$, and an exponential function is indicated as e.

14. The indoor positioning method of claim 8, wherein the creating geomagnetic signal coordinates utilizes particle filter algorithm to match moving trajectories of differential curve of magnetic fields to create the geomagnetic signal coordinates.

* * * * *